United States Patent
Andrews et al.

(10) Patent No.: US 6,952,284 B2
(45) Date of Patent: *Oct. 4, 2005

(54) MANUALLY OPERATED DIGITAL PRINTING DEVICE

(75) Inventors: Gregory Paul Andrews, Rochester, MN (US); Christopher Robert Smith, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 932 days.

This patent is subject to a terminal disclaimer.

(21) Appl. No.: 09/943,703

(22) Filed: Aug. 31, 2001

(65) Prior Publication Data

US 2003/0043388 A1 Mar. 6, 2003

(51) Int. Cl.$^7$ ............................................. G06K 15/00
(52) U.S. Cl. ...................................... 358/1.5; 358/1.8
(58) Field of Search ........................... 358/1.1, 1.3, 1.4, 358/1.5, 1.8, 1.12, 1.18, 504, 530, 448, 472, 473, 470, 474, 296

(56) References Cited

U.S. PATENT DOCUMENTS

| | | | | |
|---|---|---|---|---|
| 5,825,995 A | | 10/1998 | Wiklof et al. ............... | 395/117 |
| 6,092,941 A | * | 7/2000 | Imai ........................... | 400/88 |
| 2003/0043388 A1 | * | 3/2003 | Andrews et al. ............ | 358/1.7 |

FOREIGN PATENT DOCUMENTS

WO    WO 01/94118 A1    12/2001
WO    WO 03/006249 A1    1/2003

OTHER PUBLICATIONS

"MP–21C Series Mobile Color Ink Jet Printers", publication date unknown, selected pages printed from Internet on Apr. 6, 2001.
"The BJC–50 Color Bubble Jet Printer", publication date unknown, selected pages printed from Internet on Apr. 6, 2001.
"The BJC–55 Color Bubble Jet Printer", publication date unknown, selected pages printed from Internet on Apr. 6, 2001.
"The BJC–85 Color Bubble Jet Printer", publication date unknown, selected pages printed from Internet on Apr. 6, 2001.
"FZ–500P Freedio Palm Sized Printer", publication date unknown, selected page printed from Internet on Apr. 6, 2001.

* cited by examiner

*Primary Examiner*—Arthur G. Evans
(74) *Attorney, Agent, or Firm*—Roy W. Truelson (57) ABSTRACT

A digital printing device is manually moved across a medium, and automatically prints an image on the medium by selectively engaging one or more print elements at positions corresponding to the image. Preferably, the printing device comprises a multi-element print head a pair of optical sensors which provide position and orientation data. A controller causes the print head to print the image responsive to the location and orientation determined by the optical sensors. The printing device may be hand-held and integrated into a personal digital assistant device.

24 Claims, 8 Drawing Sheets

MANUALLY OPERATED DIGITAL PRINTING DEVICE

FIELD OF THE INVENTION

The present invention relates to digital data processing, and in particular to printing devices for printing data from digital data processing systems.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The declining prices and expanding capabilities of modem computers cause them to be applied to an ever increasing variety of applications. For some years now, inexpensive "personal computers" have been available for personal use at home or for the use of a single individual at a place of business. Increased miniaturization has made it possible to design portable "laptop" computers, having essentially the same functions as desktop personal computers.

In recent years, a family of portable digital devices known as palm-tops or personal digital assistants (PDA), have been introduced. Generally, these devices are digital computing devices, but may have somewhat more limited function than the laptop or desktop personal computers. A PDA device typically contains a very small display and a very restricted keyboard for data entry when compared with the laptop or desktop. I.e., the display either shows data in a very reduced size, or more typically, shows less data that would be visible in the display of a typical desktop system. Additionally, the keys may be very small and/or limited in number, so that touch typing is not practical. These are design sacrifices which are made to reduce the size of the device to something than will fit in the palm of one's hand.

One of the limitations of a typical PDA device is the manner in which the data in the PDA can be output in "hardcopy" form (i.e., printed on paper or other medium). A conventional printing device includes a paper feed mechanism, a print head, and a moveable carriage for moving the print head relative to the paper. Such a design necessarily implies that the printing device is at least as wide in one dimension as the width of the paper. Since it is desirable to provide output on standard 8½"×11" paper or on standard A4 paper, a conventional printer is typically more than 8½ inches wide. This dimension is generally considered too large for an acceptable PDA device.

PDA designers have followed several different approaches to providing hardcopy printed output. PDA devices are commonly provided with an interface for receiving data from and sending data to another digital device. Data can therefore be transferred to another device via this interface, and the other device can print the data. The other device may be, e.g., a desktop personal computer having an attached printer, a stand-alone print station, or some other digital device. Although this approach does make it possible to print data from a PDA device, there are obvious limitations. The device which receives and prints the data is generally not portable, and therefore, it will not always be conveniently available to the PDA user when the user wishes to print something from the PDA. Additionally, the need to transfer data through another device for printing opens up a series of compatibility issues, e.g.: Is the receiving device capable of correctly handling communications with the PDA communications program? Does the receiving device have the required application software, and at the correct version and level, for printing the data? Does the receiving device have adequate storage capacity?

Another approach is to provide a dedicated digital printing device as an optional accessory to the PDA. Generally, the printing device attaches to the PDA via a cable, and receives and prints data directly from the PDA. This approach resolves most of the potential compatibility issues that may be involved in transferring data to another computer system for printed output, but it still suffers from the lack of portability. Such an optional printing accessory is still at least as wide as the paper, and therefore not intended to be carried around on the person as a PDA is. As a result, the printing accessory usually is left in a fixed location (such as the user's home or office), and is not available for use when the user is away from this fixed location.

Another approach is to provide a built-in print mechanism in the PDA, which prints on very narrow paper (usually from a roll). This solves the problem of portability, but the output medium is often of very limited value. Most documents are formatted for wider paper, and printing on such a medium means either re-formatting the document so that it doesn't look the same, or shrinking the typefonts to the point of illegibility. Finally, even such a narrow, limited function printing device adds significantly to the weight and size of the PDA.

A PDA has the potential to function as an indispensable accessory of the user that is carried everywhere, much like a wallet or purse. Ideally, the user would maintain all manner of useful information and applications on the PDA, to be available instantaneously, anywhere. However, this potential is impaired if the user must return to some fixed location to obtain hardcopy output from the PDA. A need exists for an improved technique for printing information from a portable digital device.

Although not used in PDA devices, portable hand-held printing devices for printing labels, bar codes, and the like are also known. Like other conventional printing devices, the printable image produced by such devices is constrained by the physical size of the device. An example of such a portable printing device is shown in U.S. Pat. No. 5,825,995 to Wiklof, et al.

A further need exists for a simple, portable automated printing device which is freed from the dimensional constraints of conventional print carriage mechanisms, and can thus print on paper or other media of arbitrary size significantly larger than the printing device itself.

SUMMARY OF THE INVENTION

A digital printing device is manually moved to cover an area of a print medium, and automatically prints a previously constructed image on the medium by selectively engaging one or more print elements at positions corresponding to the image.

In the preferred embodiment, the digital printing device comprises a print head having multiple print elements and a pair of optical sensors which capture successive images of the medium as the device is moved across its surface. A controller compares overlap in the successive images to determine x-y motion at the two sensors, and from this data determines the x-y location and orientation of the print head. The controller causes the print head to print the image responsive to the location and orientation determined by the optical sensors.

In the preferred embodiment, the printing device constructs a bit-map of the image prior to printing. The current position and orientation of the print head is matched to the pre-constructed bit-map. If any of the print elements is positioned over a pixel in the bit map to be printed, the controller causes the print element to fire, printing the pixel at the desired location.

In the preferred embodiment, the user initially fixes the position of the printing device, and subsequently passes the printing device back and forth across the medium to cover the entire surface. The user thus provides motion of the printhead which is conventionally provided by a carriage mechanism. Unlike the case of a conventional print carriage mechanism, printing is performed in response to an independent position determining mechanism, and the user's movements of the printing device need not be precise. I.e., the user may move the printing device in an arc or a crooked line, may overlap previously printed areas, or may skip areas and go back to them later.

The print medium is preferably plain paper, but the present invention could be employed for printing on other surfaces, particularly irregular surfaces such as clothing or three-dimensional objects. The printing device is preferably hand-held and integrated into a personal digital assistant (PDA) device, but could alternatively be some other form of digital device, such as a dedicated printing device which receives data from a separate digital device.

A printing device as described herein thus provides the capability to print an arbitrarily large image on paper or other medium, which is not limited by the physical dimensions of the printing device itself. A printed image therefore can be arbitrarily larger than the print head in all dimensions of the printing surface (i.e., the image can be both arbitrarily wider and longer than the print head). Accordingly, such a device can be integrated into a portable, hand-held digital device.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1A:
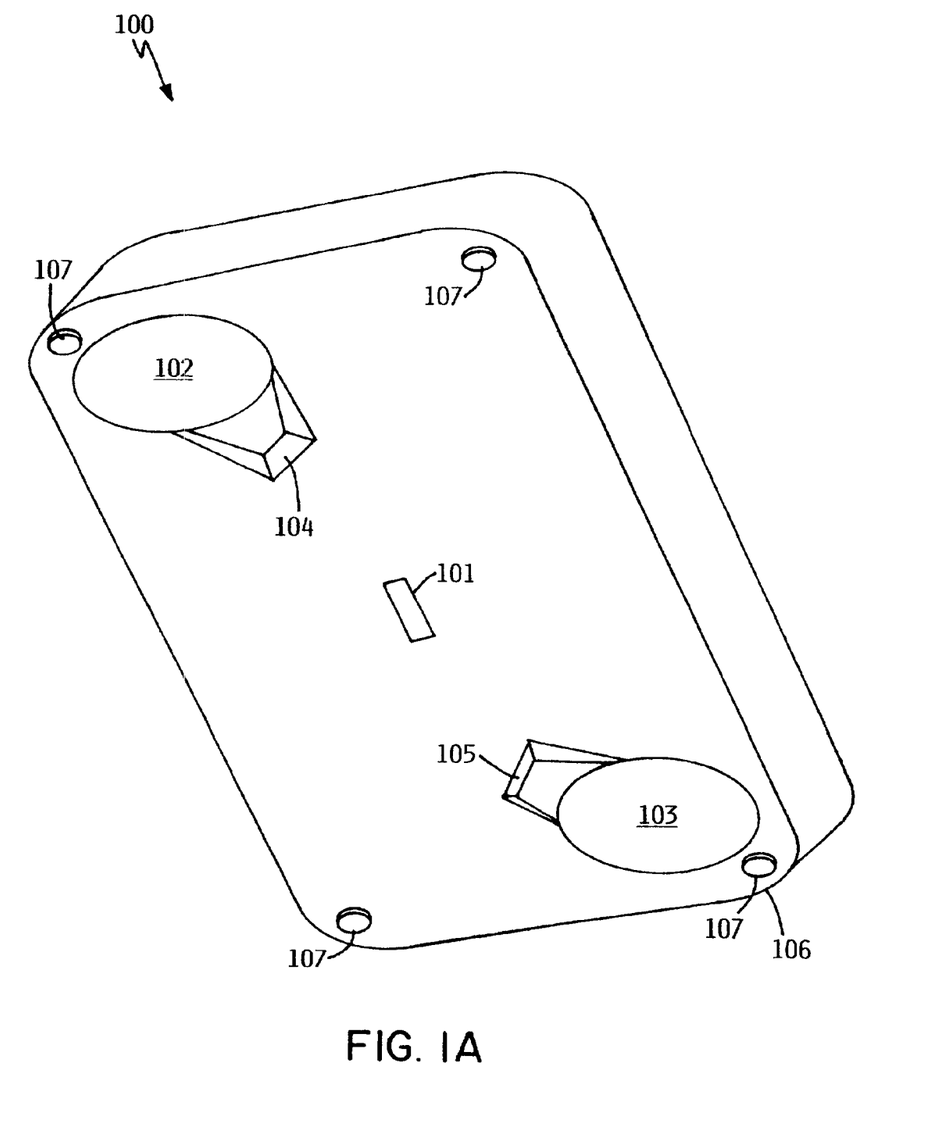
FIG. 1A is a perspective view of the underside of one version of a hand-held printing device showing placement of key printing components, according to the preferred embodiment of the present invention.

Referring to the Drawing, wherein like numbers denote like parts throughout the several views, FIG. 1A is a perspective view of the underside of one version of a manually operated printing device 100, showing placement of key printing components, according to the preferred embodiment of the present invention. Printing device 100 comprises a frame or case, herein referred to as a "body" 106, having a substantially flat surface on one side. On this side are mounted print head 101, and a pair of optical sensors 102, 103. Mounted next to each optical sensor is a respective illuminator 104, 105, which is preferably mounted within a small recess to direct light at an angle onto a printing surface. Several projections 107 at the corners of body 106 support the body on the printing surface and prevent contact between the printing surface and the body near the print head, to reduce smudging of ink. The side of the body to which components 101–105 are mounted is herein referred to as the "underside". Device 100 is preferably small enough to be hand-held, and can be turned or operated in any arbitrary orientation. However, it is anticipated that printing operations will most frequently be performed by placing the device with the underside down on a horizontal printing surface such as paper and moving the device with the hand to scan the entire printing surface, as herein described. For this reason, the side with the printing components is referred to as the "underside".

Figure 1B:
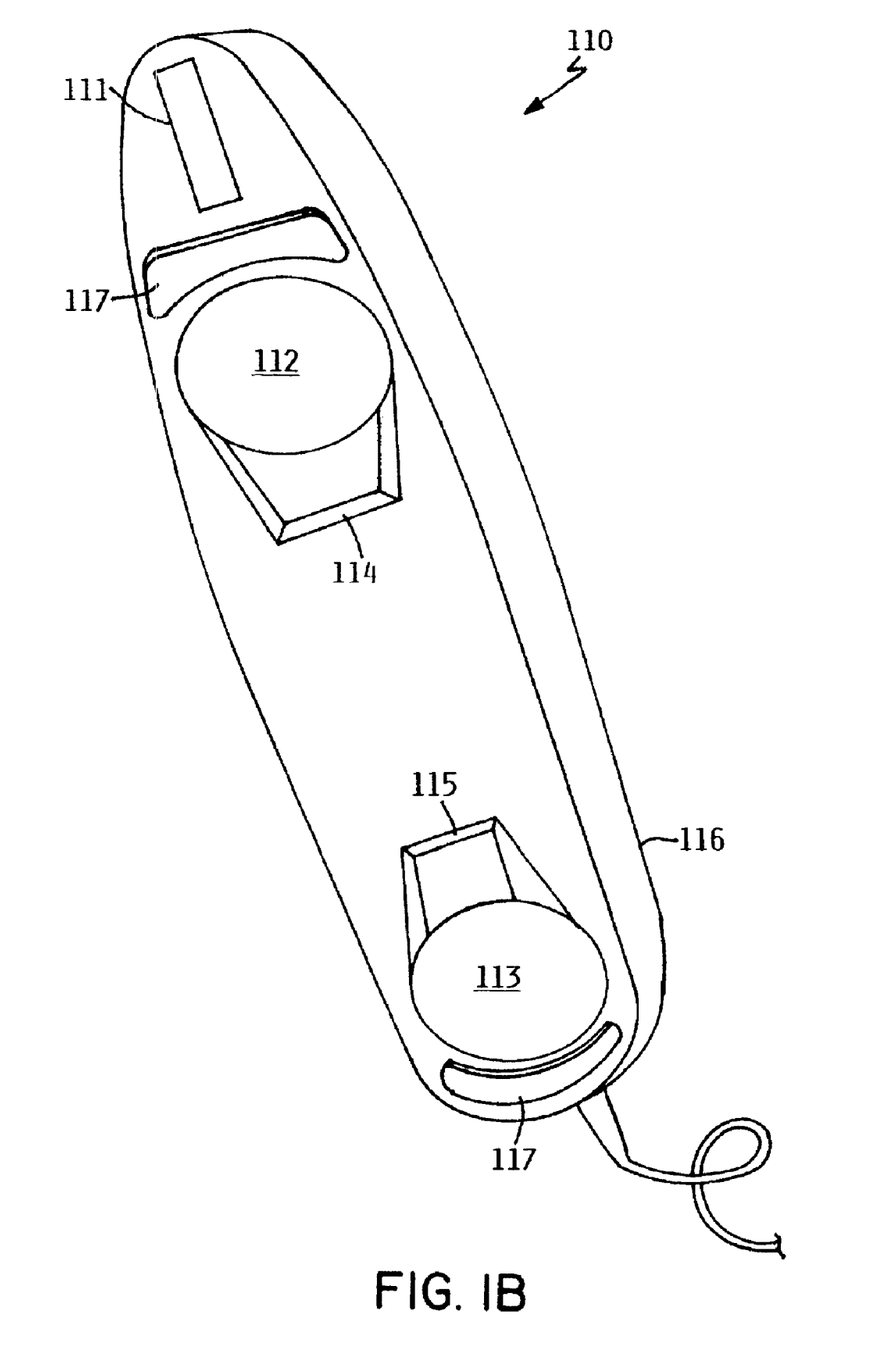
FIG. 1B is a perspective view of the underside of an alternative version of a hand-held printing device showing placement of key printing components, according to the preferred embodiment of the present invention.

FIG. 1B is a perspective view of the underside of an alternative version of a manually operated printing device 110, according to the preferred embodiment of the present invention. Printing device 110 comprises a frame or case, herein referred to as a "body" 116, having a substantially flat surface on one side. On this side are mounted print head 111, and a pair of optical sensors 112, 113 with respective illuminators 114, 115, within recesses. Projections 117 support body 116 on the printing surface.

Device 110 is shown as a relatively narrow device, such as might be used where the device is a dedicated printing device having no other function. For this reason device 110 is depicted in FIG. 1B with a communications cable for communicating with another data processing device. Device 100 is shown as a relatively wider device, such as might be used where the device is a personal digital assistant (PDA) device having an integrated printing function as described herein. In the description herein, reference numbers 100–107 are used to identify the various features for purposes of describing the preferred embodiment. It should be understood, however, that the description herein could apply as well to reference numbers 110–117, respectively.

Figure 2:
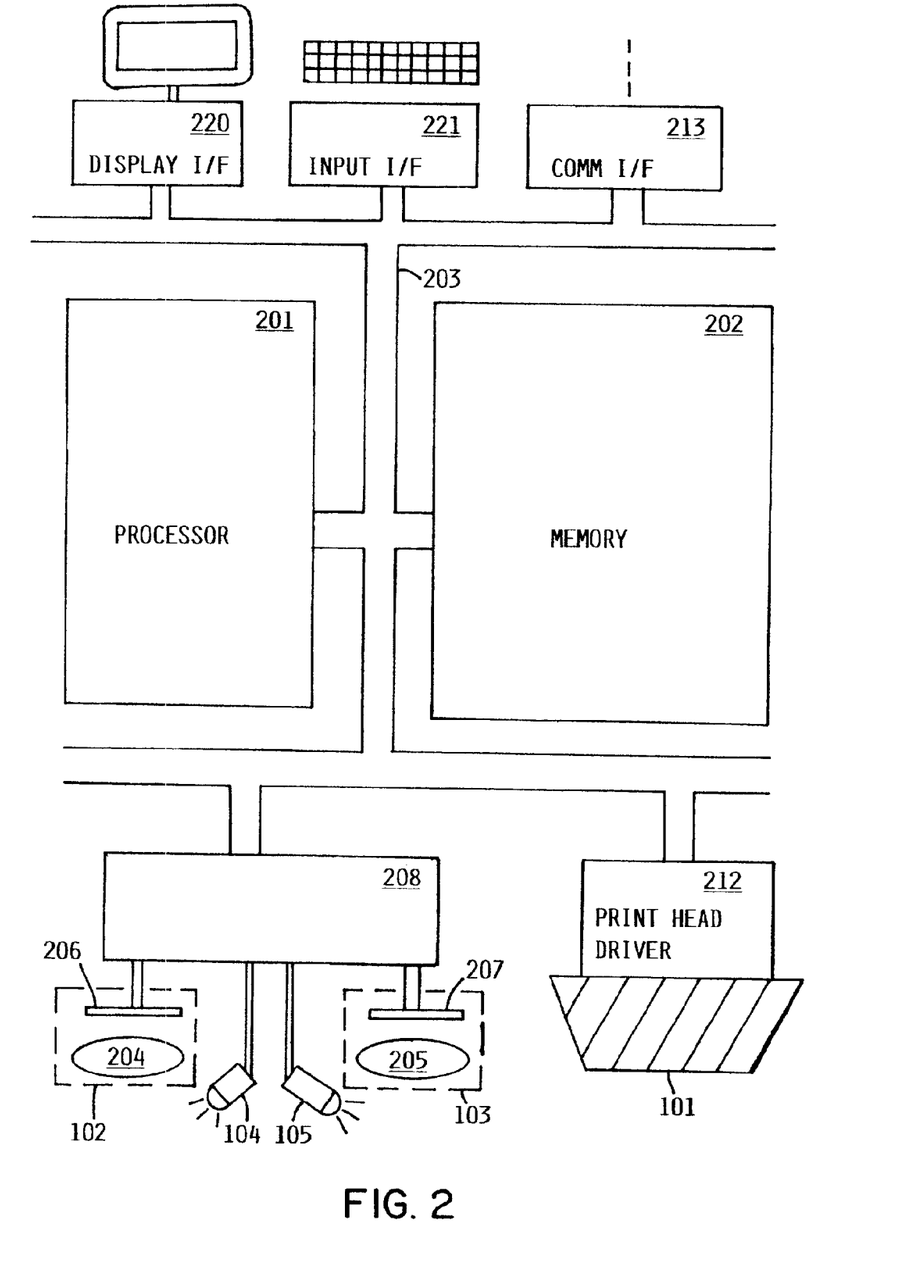
FIG. 2 shows the major internal components of a hand-held printing device, according to the preferred embodiment.

FIG. 2 shows the major internal components of printing device 100, according to the preferred embodiment. As shown in FIG. 2, printing device 100 contains processor 201 and memory 202, coupled by communications bus 203. Processor 201 is preferably a general purpose programmable processor of the type typically found in PDAs, laptops, or desktop personal computers, which executes instructions stored in memory 202. Among other things, these instructions cause processor 201 to control the operation of printing functions, as described more fully herein. Memory 202 is a random access semiconductor memory for storing instructions and other data. While shown as a single monolithic entity, memory may contain multiple modules of differing physical composition. E.g., a portion of memory 202 may be non-volatile memory such as read-only memory or flash memory, while other parts of memory are dynamic read/write memory. Furthermore, there may be multiple levels of memory such as processor caches at one or more levels, in addition to main memory. Communications bus 203 provides a data communications path among processor 201, memory 202, and other components of printing device 100.

Printing device 100 further contains a pair of optical sensors 102, 103. Preferably, these sensors are of the type used for sensing x-y motion in so-called optical mice pointing devices, as are known in the art. Each optical sensor is effectively a miniature digital camera, containing a respective focusing lens 204, 205 and optical scanning array 206, 207. Each optical scanning array is a two-dimensional array of light sensitive elements, from which an image may be formed. The scanning arrays 206, 207 are coupled to scanning electronics 208, which preferably include common bus interface electronics for interfacing with bus 203 and communicating data to other components of printing device 100, a common digital signal processor, and other appropriate electronic circuits for scanning the output of the array and producing a digital image. Associated with each optical sensor 102, 103 is a respective illuminator 104, 105, which are used to illuminate the area to be scanned or photographed by the optical sensors. Illuminators 104, 105 are preferably light-emitting diodes, energized by respective illuminator drivers in scanning electronics 208. Although certain components of scanning electronics 208 are shared by both sensors, it would alternatively be possible to use separate scanning electronics for each sensor.

Printing device 100 further contains a print head driver 212 coupled to bus 203, which energizes selective elements of print head 101 responsive to commands received over bus 203 from processor 201. Print head 101 is preferably an ink-jet print head containing multiple individual print elements and an ink well. As is known in the art, either the well alone or the well and print element assembly should be a replaceable part, allowing a new well to be used when the ink supply becomes exhausted. Ink-jet print head technology is preferred because it is a well-established, mature technology which requires no special type of paper for printing. However, any of various other printing technologies, now known or hereafter developed, could alternatively be used.

Printing device further contains an external communications interface 213 for communicating with an external digital device. This communications interface may use any of various communications means, now known or hereafter developed. For example, communications with an external device may be by means of an attached cable using any appropriate protocol, or may be an infra-red, radio frequency, or other transmission link. Furthermore, the external interface may be designed for intermittent connection and transfer of data; e.g., the interface may be a plug which temporarily mates with a corresponding plug in another digital device, and communicates data only while mated.

In the preferred embodiment, printing device 100 is a small, multi-function computing device such as a personal digital assistant or palmtop computer, into which the printing function is integrated. Device 100 therefore further includes display interface 220 and display for displaying information to a user, and an input interface 221 and input device(s) for receiving input from a user. The display is typically an LCD display. Input may be by means of a small alphanumeric keyboard, or by means of a limited number of function keys. Input devices typically also include a pointing device, which could be a touch screen which senses a finger or stylus touching the display, joystick, trackball, or any of various alternatives.

Although in the preferred embodiment, device 100 is a multi-function device into which printing capability is integrated, it should be understood that device 100 could alternatively be a dedicated printing device having no other function, which receives data for printing over external interface 213 and prints data as described herein. In this alternative implementation, it is likely that device 100 would not contain display 220 or would contain a very limited display (such as a one-line status display), and may contain only a very limited number of input keys or buttons.

Figure 3:
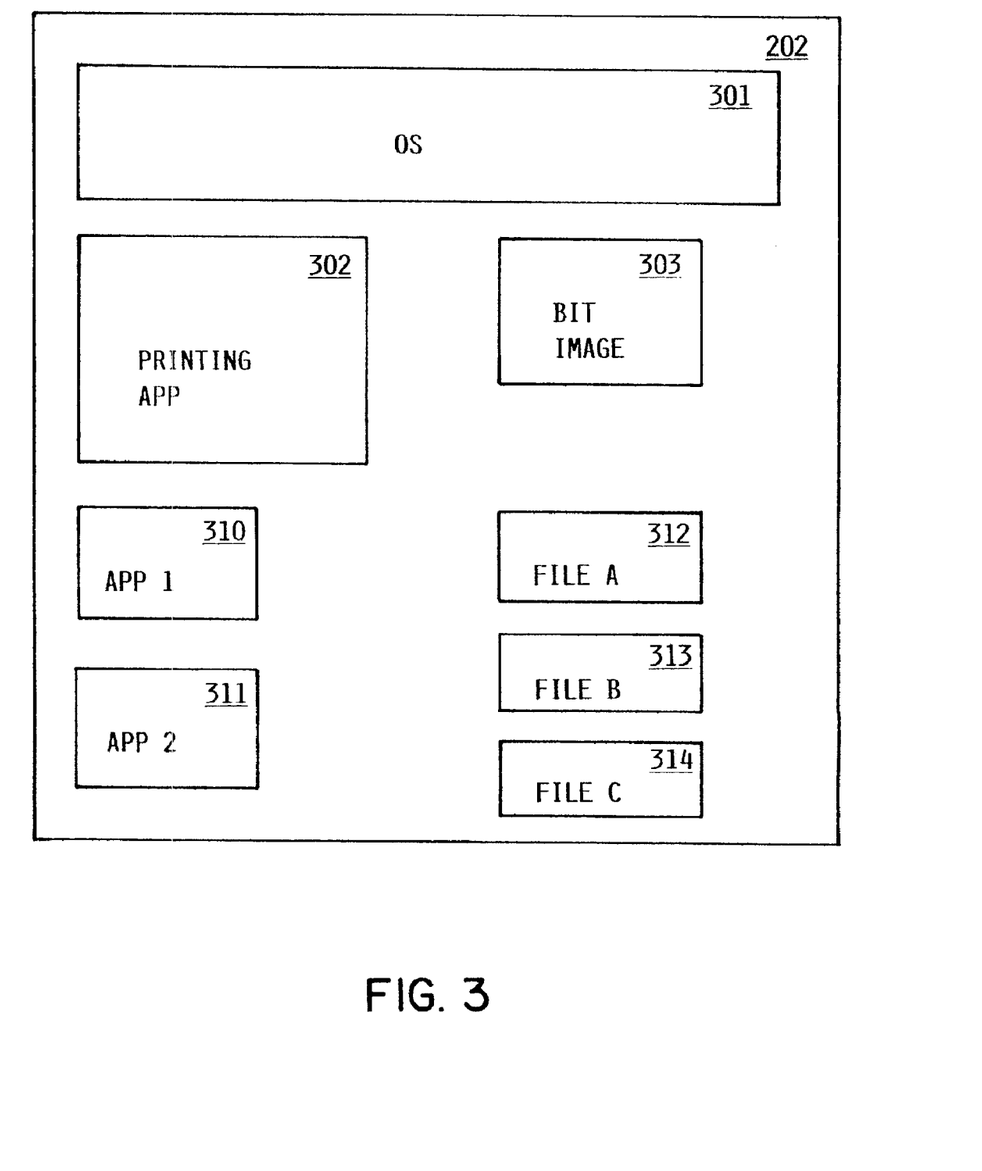
FIG. 3 is a conceptual illustration of the major software components in the memory of a printing device, according to the preferred embodiment.

FIG. 3 is a conceptual illustration of the major software components of printing device 100 in memory 202. Operating system 301 provides various low-level software functions, such as device interfaces, management of windowing interfaces, management of multiple tasks, etc., as is well-known in the art. In addition to operating system 301, memory 202 contains printing application 302, and may contain various other application programs 310–311. These applications may include, e.g., electronic calendar, internet browser, messaging, or any of numerous other possible applications. Applications 310–311 utilize data contained in data files 312–314. FIG. 3 also shows a bit image or bit map 303 of data to be printed using printing application 302. The function of the bit image in conjunction with printing application 302 is described more fully herein.

While a certain number of application programs, files or other entities are shown in FIG. 3, it will be understood that these are shown for purposes of illustration only, and that the actual number and type of such entities may vary. Additionally, while the software components of FIG. 3 are shown conceptually as residing in memory 202, it will be understood that device 100 may additionally contain on-board data storage such as a rotating magnetic disk drive storage device, that memory 202 may be too small to hold all programs and data simultaneously, and that information may be paged into memory by the operating system as required. It will further be understood that, in an alternative embodiment where device 100 functions only as a printing device without other function, memory 202 will typically contain only the printing application 302, bit image 303, and a limited set of additional functions needed for external communication, memory management, and the like.

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution.

Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 2 as memory 202.

Of particular interest is printing application 302, which when executed by processor 201, controls the function of printer components and causes data to be printed on a printing surface. Printing application 302 is represented in FIG. 3 as an entity separate from OS 301 and from other application programs 310–311. However, it should be understood that a printing application as described herein could be integrated into other applications or into the operating system.

Printing application 302 may be invoked in any conventional manner. Where, as in the preferred embodiment, application 302 is but one application in a PDA device having multiple applications, application 302 may be invoked by entering a command from a keyboard or selecting an application icon from a display. Where OS 301 is a windows-based operating system, invoking application 302 will typically cause a window corresponding to the printing application to be generated. This window may be used for specifying certain user options, such as a file to be printed, or other options. It may additionally be used to display the image to be printed before printing. Alternatively, where printing device 100 is a stand-alone printing device, the application may be invoked by pressing an appropriate function button or combination of buttons.

Figure 4:
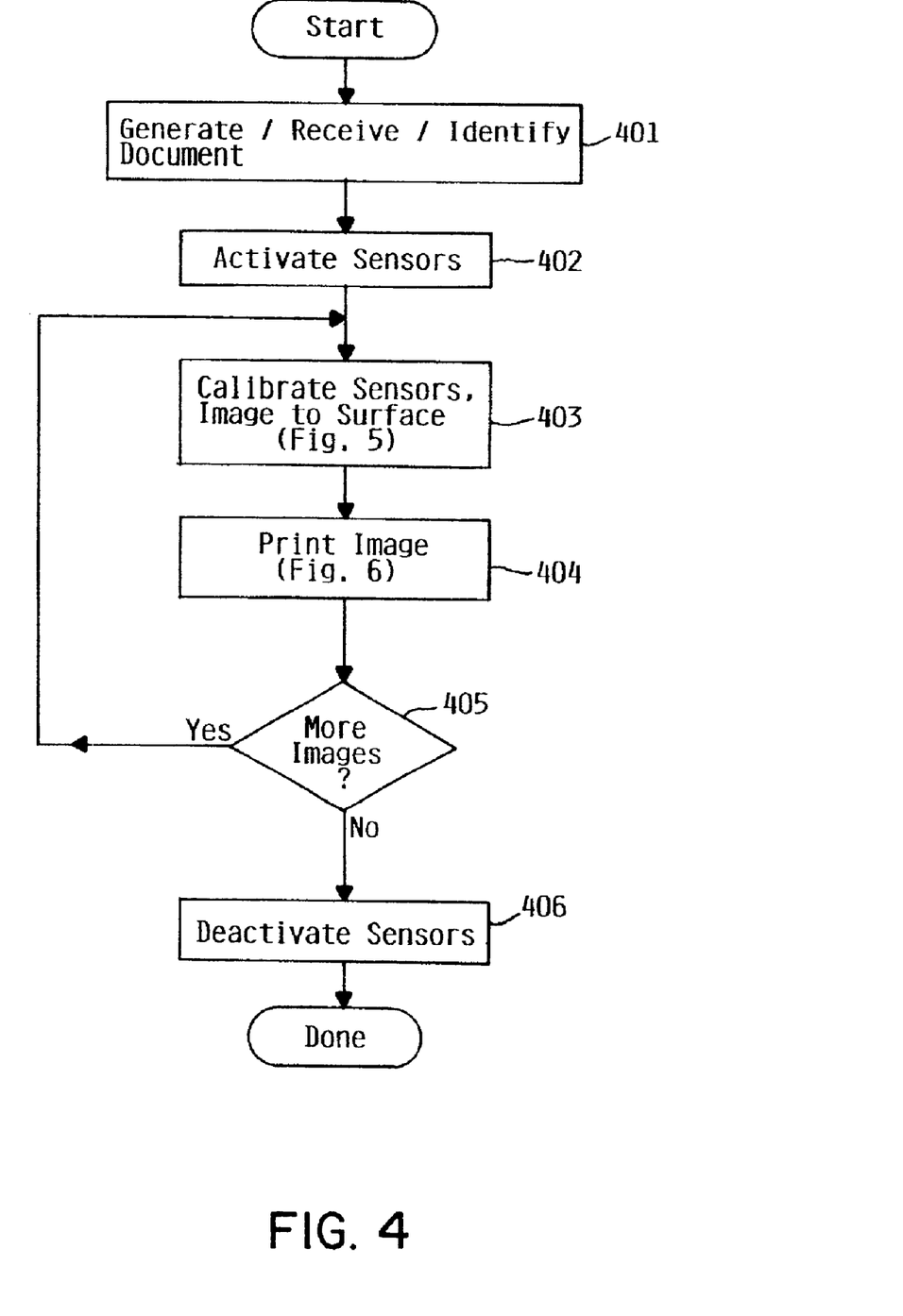
FIG. 4 is a high-level flow diagram illustrating the operation of a printing application, according to the preferred embodiment.

FIG. 4 is a high-level flow diagram illustrating the operation of printing application 302, according to the preferred embodiment. As shown in FIG. 4, upon invoking the printing application, a document containing one or more images to be printed are generated, received, or otherwise identified to the application (block 401). This may be accomplished in any of various ways, of which some of the more common are mentioned here. A document to be printed will typically be generated by a different application, such as a word processing application, a calendar application, an electronic messaging application, etc. Such a document may be generated by a digital system external to printer 100, and transmitted or downloaded to printer 100 through communications interface 213. Such a document may be formatted for printing as a bit image, or as text, or using any print formatting protocol, now known or hereafter developed. In a typical PDA application, multiple potentially printable documents may reside in the memory 202 of device 100. When the printing application 302 is invoked, the user will therefore select a document of these multiple potentially printable documents for printing using printing application. Block 401 should be understood to include such a selection step if it is required, as well as any other steps above described.

For ease of understanding, it is assumed herein that the printing device 100 prints only a black-and-white image. It will be understood that a printing device consistent with the present invention could alternatively be designed to print color images, in which case the so-called bit-map of the image would necessarily be a pixelized color image, each pixel representing a respective color and shade.

The printing application activates the optical sensors 102–103 and associated components to generate coordinate data (block 402). This may be done upon invoking the printing application, or responsive to a user command while within the application. Preferably, the optical scanning arrays 206, 207, scanning electronics 208, and illuminators 104, 105, are turned off when the printing application is not active in order to conserve power, and therefore it is necessary to activate these components before printing. E.g., in a typical PDA device, the device is most often used to display data to a user, and printing would occupy only a small fraction of the time that the device is in use. However, it would alternatively be possible to activate the sensors at all times that device 100 is powered on; this alternative is more likely when device 100 is used only as a printing device.

Once the sensors are activated, scanning electronics 208 cause each scanning array 206, 207 to periodically capture an image of the adjacent surface, i.e., the printing surface. The interval between successive image scans is chosen to be sufficiently short so that under normal operating conditions, there is significant overlap in the images. Each successive image of the surface is compared with at least one prior image to determine a distance, $\Delta d$, that the sensor has moved with respect to the surface in the time interval between image capture. The distance $\Delta d$ is a vector quantity which may be represented as $(\Delta x, \Delta y)$ in an x-y coordinate system, herein referred to as the x-y coordinate plane of the sensors. Preferably, scanning electronics 208 include a digital signal processor and/or other hardware which analyzes successive images and determines the difference in the position of the images, $(\Delta x, \Delta y)$. Thus, scanning electronics 208 produce a sequence of x,y coordinates for each sensor. These may be output as movements, $(\Delta x, \Delta y)$, corresponding to the motion of the optical sensors 102, 103 with respect to the printing surface, or may be output as position coordinates (x,y), corresponding to the current position of the sensors, the position coordinates (x,y) being merely accumulated values of $(\Delta x, \Delta y)$. In the discussion below, it is assumed that position coordinates (x,y) are used, it being understood that if the sensing electronics output values of $(\Delta x, \Delta y)$, these could easily be translated by printing application 302 to position coordinates. In this coordinate system, the y-axis is reversed from normal orientation. This data is output via communications bus to memory 202. Printing application 302 receives this coordinate data to maintain a current x-y coordinate position for each of the optical sensors, the current position being updated with each new scan of the print surface by an optical scanning array.

With the sensors activated and the print image obtained, the user then calibrates the sensors and the image to the printing surface. This process is represented in FIG. 4 as block 403, and is shown in greater detail in FIG. 5.

Figure 5:
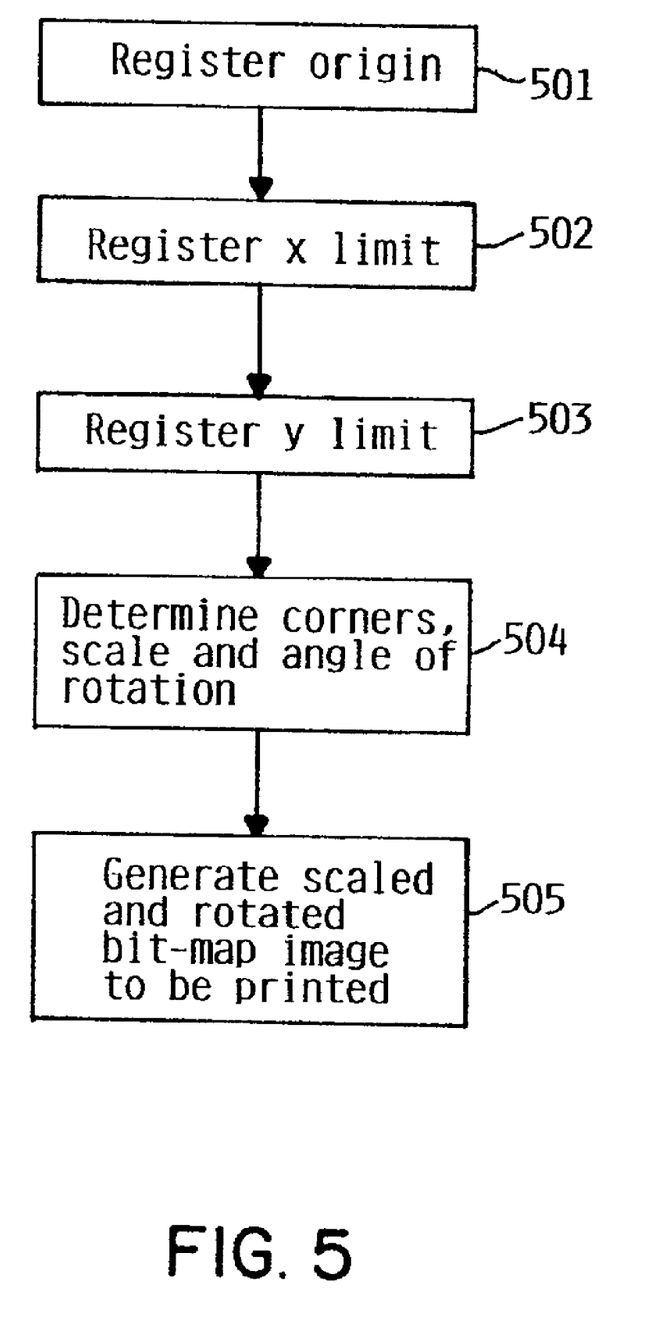
FIG. 5 is a flow diagram illustrating in greater detail the process of calibrating the printer position sensors to the printing surface, according to the preferred embodiment.

Referring to FIG. 5, the user first places printing device 100 at an origin point, and indicates to the device that it is at the origin (step 501). The printing device may be brought to the origin in any manner, but once the origin is selected, the device should not be lifted from the printing surface until printing of the image is complete, or the device will become lost and not know its current x-y position. By convention, the origin is selected as the upper left corner of the printing surface, although this convention is arbitrary, and any corner or other consistent reference point could be used. Where, as in the preferred embodiment, the printing surface is paper, it should be placed on a hard, flat surface for ease and consistency of registration. The user may indicate that the device is properly positioned by any conventional means, as by pressing a function button on the device.

The device records the coordinates of the origin (designated $(x_1, y_1)$) in response to the user indication. The origin, as well as the other two calibration points discussed herein, are single points. These could be chosen to correspond to the location of a single sensor, or to correspond to the print head (which is derived from the positions of the two sensors), or some other point, such as a corner of device 100, which is also derived from the positions of the two sensors. Preferably, the same location on the device is used for all three calibration points, although this is not necessarily the case. In the description below, it is assumed that the device layout and print head location of FIG. 1A, being approximately midway between the two sensors, is used, so that the coordinates $(x_1,y_1)$ are really the average of the x-y coordinates of the two sensors at this location. It will be understood that where the physical placement of print head and sensors is different, as in device 110 of FIG. 1B, the calibration should be adjusted accordingly.

The user then moves the printing device to a second calibration point, which in the preferred embodiment is the upper right corner of the printing surface, and selects this point in the same manner as the origin was previously selected (step 502). The x-y coordinates of the second point $(x_2,y_2)$ are recorded. The user then moves the printing device to a third calibration point, which in the preferred embodiment is a point on the bottom edge of the printing surface, and selects this point in the same manner as the previously selected points (step 503). The x-y coordinates of the third point $(x_3,y_3)$ are recorded.

The printing application then uses the three calibration points to determine the boundaries, scale and angle of rotation of the printing surface within the coordinate plane of the sensors. (step 504). The origin is defined as the upper left corner of the printing surface, and the second calibration point as the upper right corner. A line between these two points is the top edge. I.e., in the x-y coordinate system of the sensors, this line is defined as:

$$\text{top}=m^*x+b=(y_2-y_1)/(x_2-x_1)^*x+y_1-(y_2-y_1)/(x_2-x_1)^*x_1.$$

A line parallel to the top edge and intersecting the third point is defined as the bottom edge, i.e.:

$$\text{bottom}=m^*x+b'=(y_2-y_1)/(x_2-x_1)^*x+y_3-(y_2-y_1)/(x_2-x_1)^*x_3.$$

A line perpendicular to the first line and intersecting the origin is the left side, i.e.:

$$\text{left}=-(1/m)^*x+b''=-(x_2-x_1)/(y_2-y^1)^*x+y_1+(x_2-x_1)/(y_2-y_1)^*x_1.$$

A line perpendicular to the first line and intersecting the second point is the right side, and may be computed similarly. The lower left corner $(x_4,y_4)$ is the intersection of the left and bottom lines, i.e.:

$$x_4=[y_1+(x_2-x_1)/(y_2-y_1)^*x_1-y_3+(y_2-y_1)/(x_2-x_1)^*x_3]/(m+1/m),$$

$$y_4=m^*x_4+b'=m^*x_4+y_3-(y_2-y_1)/(x_2-x_1)^*x_3.$$

The width of the writing surface in the x-y coordinate system is the distance from the second point to the origin, i.e., $$\text{width}\_ws=\text{SQRT}((x_2-x_1)^2+(y_2-y_1)^2)$$

The length of the writing surface (length_ws) is similarly computed as the distance from the fourth point (lower left corner) to the origin.

A width scaling factor for the image is then computed as the ratio of the width determined above to the width of the image to be printed, according to any frame of reference in which the image is now stored, i.e., $$\text{WScaleFactor}=\text{width}\_ws/\text{image}\_\text{width}.$$

A length scaling factor (LScaleFactor) is similarly determined. It will be observed that the determination of the length and width scaling factors is independent. In other words, printing application 302 will attempt to scale the image to fill the printing surface, without preserving the image's original aspect ratio. However, the application could alternatively determine the largest scale factor that will fit and use that scale factor for both length and width, thus preserving the aspect ratio. The decision whether or not to preserve the aspect ratio could also be a user specified option within the printing application.

The printing application then determines the angle of rotation of the printing surface in the x-y coordinate system. While this could be determined in various ways, the angle of the left edge with the y-axis is used, i.e.:

$$\text{angle}\_rtn=\arccos((y_4-y_1)/\text{Length}\_ws)$$

If $x_4<x_1$, then angle_rtn calculated above is set to −angle_rtn.

Optimally, the user should hold the print device in a known, consistent orientation at all three calibration points to minimize the effects of differences (gain and/or coordinate orientation) between the sensors themselves, although this is not strictly necessary, particularly if the sensors have been pre-calibrated with respect to each other at manufacturing time (see below). The two sensors simply report a pair of positions, from which the angular orientation of the print head is determined. Registration marks may be placed on the outside of the body to assist the user in maintaining a consistent alignment, the registration marks being aligned with edges of the paper or other identifiable features of the printing surface.

For purposes of clarity in explaining the calibration procedure described above, it has been assumed that both sensors 102, 103 have identical gain characteristics, i.e., that both will produce an identical difference in coordinate output when moved an identical distance. It has further been assumed that both sensors are aligned with respect to each other in an x-y coordinate system, i.e., that the x and y axes of both sensors are aligned. In fact, as mentioned above, the sensors themselves detect only relative motion, so the coordinate system is arbitrary. It may be possible to control manufacturing parameters so that the sensor arrays themselves have sufficiently close x-y alignment (parallel axes) and gain characteristics. In this case, it would merely be necessary to initialize the sensor positions to some known values. E.g., sensor A may be initialized to (0,0), and sensor B to $(x_0,y_0)$, where $(x_0,y_0)$ is a predetermined, fixed coordinate location corresponding to the known physical distance between the two sensors. If it is impractical to control manufacturing parameters so that the sensor arrays themselves have sufficiently close alignment and gain characteristics, it would be possible to calibrate device 100 at the time of manufacture so that the x-y coordinate output of the digital signal processor is synchronized. This is accomplished as follows. After affixing the sensors to the body, the body is placed in a fixture over a scanning surface and moved in a straight line without rotation. This translational motion without rotation should produce a raw $(\Delta x,\Delta y)$ output for each sensor. One of the sensors may arbitrarily be selected as the standard, and the other sensor calibrated to the standard sensor. In this case, the distance ($\Delta d = \mathrm{SQRT}(\Delta x^2 + \Delta y^2)$) recorded by each sensor is computed and compared, and the output of the non-standard sensor is scaled to that of the standard. Additionally, the angle with respect to the x-axis ($\arctan(y/x)$) is computed, and the output of the non-standard sensor is rotated to that of the standard. The scaling factors may be saved in a non-volatile area of memory in the device. It would alternatively be possible to calibrate the two sensors to each other at the beginning of each print operation in a similar manner, but since this would necessarily rely on the user to provide translational motion without rotation, it would probably be less accurate that a calibration at manufacturing time in a fixture.

Having determined the scale and rotation of the print surface in the coordinate system of the sensors, the printing application then constructs a bit-map of the image in the same coordinate system (block 505). The method of constructing a bit map depends of the form of the stored original image which was identified, received, or generated at block 401. If the original image is itself a bit-map, it is merely necessary to scale and rotate the bit map using the WScaleFactor, LScaleFactor, and angle__rtn, previously computed. Various conventional formulae or graphical functions exist which will scale and/or rotate a bit-mapped image to an arbitrary coordinate system, given the scaling factors and the rotation angle, and any such conventional method may be used. If the original image is not a bit map (e.g., consists of text in scalable fonts), the scaling factors WScaleFactor and LScaleFactor, may be used as coefficients to a bit-map construction function which will construct a bit-map of the proper size. Some bit-map construction functions may also support an arbitrary angle of rotation input, in which case angle__rtn may be input directly to the construction function. Where a construction function supporting arbitrary scaling factors and angles of rotation does not exist, a bit-map may be rendered using any available scale, and subsequently scaled and rotated using a conventional bit-map scaling and rotating function, as described above.

Figure 7:
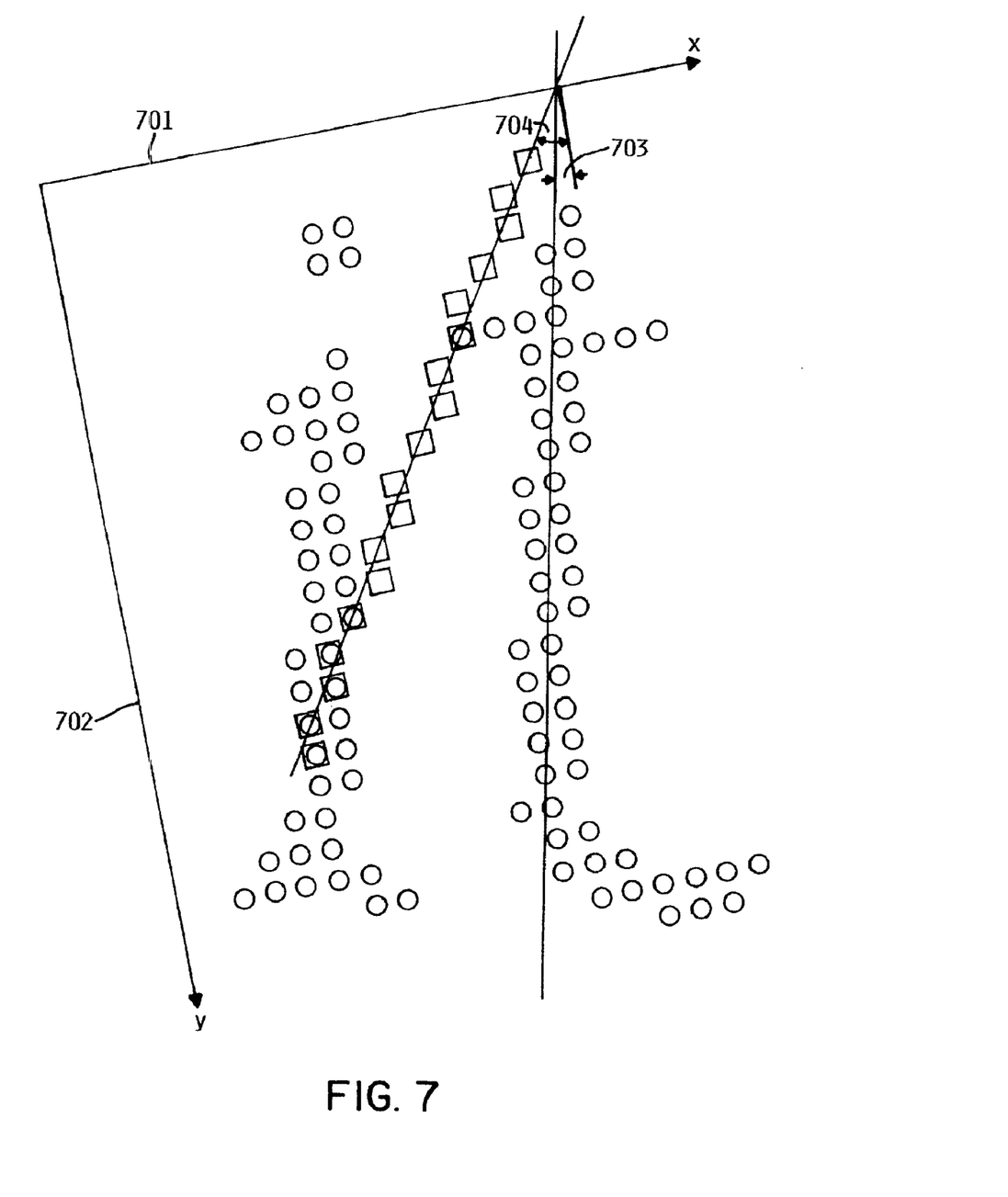
FIG. 7 is a graphical representation of a scaled and rotated bit image in the coordinate plane of the position sensors, according to the preferred embodiment.

FIG. 7 is a graphical representation of a scaled and rotated bit image in the coordinate plane of the sensors. FIG. 7 depicts a bit image of the lower case characters "it", represented as round dots. As shown in FIG. 7, the output of the sensors define an x-axis 701 and y-axis 702, into which the bit image is mapped. In the preferred embodiment, only integer values of x and y are allowed. Therefore, the bit image is mapped on a rectangular grid of the x-y coordinate plane. The image forms an angle of rotation (angle__rtn) 703 with the coordinate plane. Because the angle of rotation in generally non-zero, the pixels of the character bit image do not necessarily align themselves perfectly with the coordinate points of the x-y coordinate plane. Thus, it will be observed in FIG. 7 that the pixels in the vertical portions of the characters exhibit a staggered pattern.

After calibrating the sensors and scaling and rotating the print image as described above, the user prints the image. Preferably, the user manually moves the printing device back and forth across the printing surface. In doing so, the user should take care not to lift the device from the printing surface, or the sensors may lose their bearing. However, the user need not move the printing device in perfectly straight lines, or maintain any particular angular orientation of the printing device. Within the device, the printing application receives sensor output from which it fits the current position of the print head to the previously scaled and rotated bit-map image to be printed, and selectively fires the print elements when the print head elements are in the correct position. This process is represented in FIG. 4 as block 404, and is shown in greater detail in FIG. 6.

Figure 6:
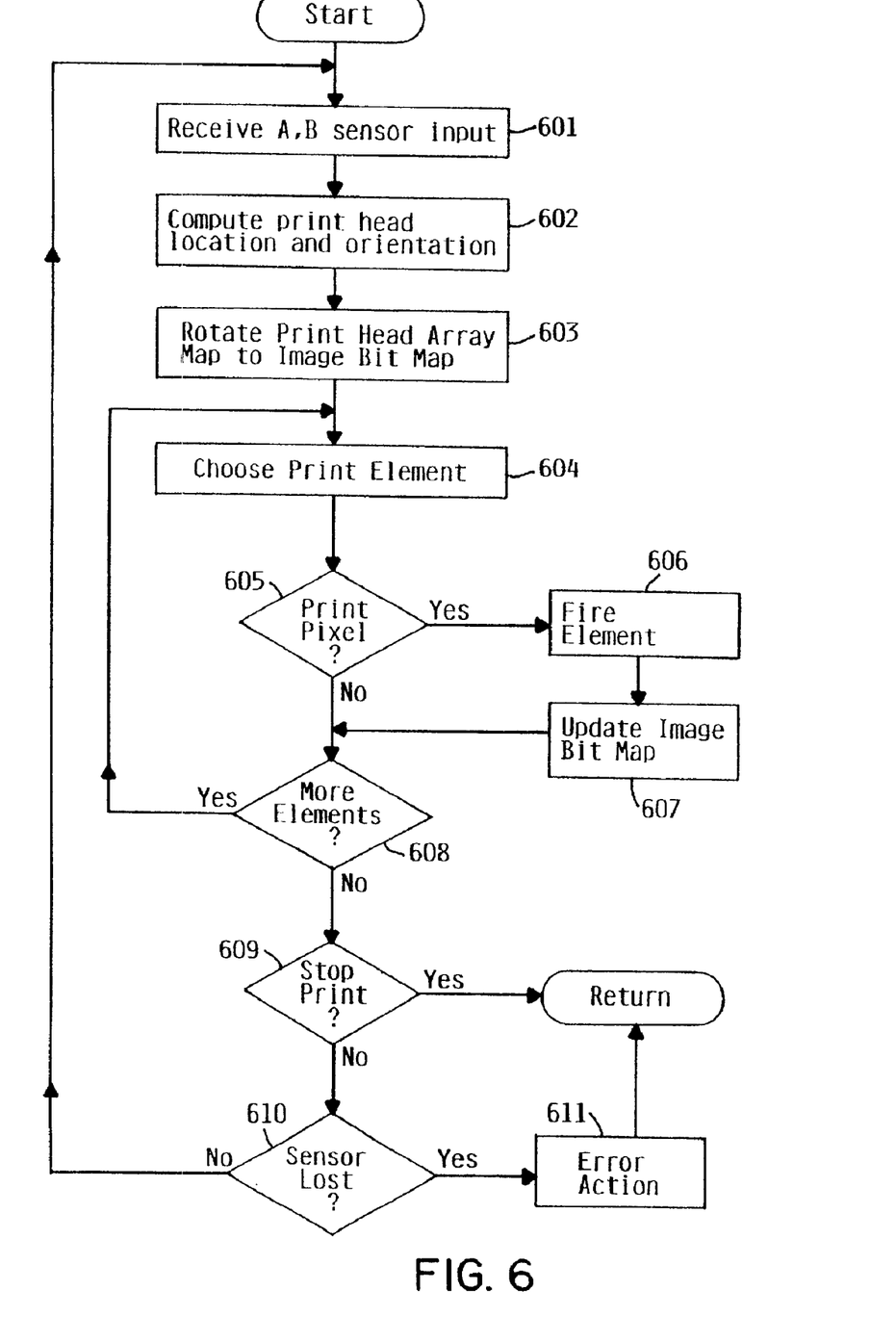
FIG. 6 is a flow diagram illustrating in greater detail the process of printing an image on a printing surface responsive to the output of position sensors, according to the preferred embodiment.

Referring to FIG. 6, print application 302 receives the x-y coordinate output of the two sensors, which will be referred to herein as sensors A and B (block 601). I.e., the application receives a coordinate ($x_A, y_A$) for sensor A, and a coordinate ($x_B, y_B$) for sensor B. It then computes the print head location and angular orientation in the x-y coordinate plane of the sensors, from the coordinates ($x_A, y_A$) and ($x_B, y_B$) and the known physical orientation of the sensors with respect to the print head in the print device (block 602). For example, where the print head is located approximately mid-way between the two sensors as shown in FIG. 1, the center of the print head will be at approximately (($x_B - x_A)/2, (y_B - y_A)/2$). The angular orientation of the print head will be $\arccos((y_B - y_A)/D) + \theta$, where D is the distance between the two sensors in coordinate units, and $\theta$ is the known angle of the print head with respect to a line drawn between the two sensors. If necessary, the distance D can be calculated as $$\mathrm{SQRT}((x_B - x_A)^2 + (y_B - y_A)^2).$$

The print application then "superimposes" a print head array map on the image bit map in the coordinate plane of the sensors (block 603). The print head array map is an image corresponding to the individual print head elements. In the preferred embodiment, multiple print head array maps are pre-stored, each map corresponding to a respective angular orientation of the print head in the coordinate plane of the sensors. The number of such maps is a matter of design choice; e.g., there could be a map for every 10 degrees of rotation, for every 5 degrees of rotation, for every degree of rotation, or even smaller increments, depending on the accuracy desired. The map corresponding to the angular orientation of the print head determined at block 602 is selected, and this map is "superimposed" on the bit map image at the print head location previously determined. I.e., the coordinates of the print head array elements are determined in the coordinate plane of the sensors, which is the same as the coordinate plane of the image bit map. Since these coordinates are all integers, this means that for each element of the print head in the print head array map, there is a corresponding pixel represented in the image bit map, which is either a pixel to be printed, or not. Depending on the orientation angle 704 and the physical distance between the print elements, it is possible that two print elements may map to the same (x,y) coordinate; in this case, the print element physically closest to the coordinate intersection may be chosen, and the other print element merely deactivated in the current position.

Referring again to FIG. 7, a series of print elements, represented as squares, is superimposed on the bit image in the x-y coordinate plane of the sensors. The line of the print head makes an angle of orientation 704 with the y-axis, the angle of orientation 704 of the print head being independent of the angle of rotation 703 of the image. Because these print elements are mapped to discrete integer x-y coordinates in the x-y coordinate plane of the sensors, the series of squares in FIG. 7 is not perfectly aligned, but is staggered, whereas in physical construction the print elements are aligned in a straight line on the print head.

The print application then selects each print element in the print head array map in turn (block 604), and determines the state of the corresponding pixel in the image bit map, i.e., the pixel having the same x-y coordinates in the coordinate plane of the sensors (block 605). If the corresponding pixel bit is set, this indicates that the pixel needs to be printed, and the "Y" branch is taken from block 605. In this case, the print application causes the corresponding element of the print head to fire (block 606), printing a single pixel at the current location of the print head element over the printing surface. The print application then clears the corresponding pixel bit in the image bit map (block 607). Clearing the bit prevents the print head from printing the same pixel again, which may make certain areas of the printed image appear unduly dark. The print application then determines whether there are more elements in the print head array map (block 608), and if so, selects another element to process at block 604.

When all elements of the print head array have been processed, the "N" branch is taken from block 608. If a stop print condition is now present (block 609), the printing application will stop printing the image and return. Printing is stopped if all pixels in the image bit map have been printed, or if the user indicates (by pressing an appropriate function button or otherwise) that printing is finished. Because the printing application does not automatically stop printing until all pixels are printed, and it is possible to skip an occasional pixel during printing, the user may wish to abort printing at some point rather than hunt for the missing pixel.

If printing is not stopped at block 609, the print application waits for more sensor output. The application may determine that the sensors are lost, usually as a result of lifting the printing device from the printing surface (block 610). If the sensors becomes lost, the application takes some error recovery action, which is represented as block 611. The nature of this error recovery action may vary, and is not described in detail herein. For example, the application may give the user a message, and request the user to confirm whether the user wishes to abort printing or continue. If printing is to be continued, the printing device should be re-calibrated as described earlier. If the sensors are not lost, the printing application returns to block 601 upon receiving the next set of x-y coordinates from the sensors.

After printing a complete image at block 404, the application determines whether additional images (e.g., pages of a multi-page document) remain to be printed (block 405). If so, the application proceeds to block 403, where the user calibrates the sensors to a new printing surface, such as a new page. When all images have been printed, the "N" branch is taken from block 405, and the sensors are deactivated (block 406).

As described above, the image to be printed is scaled and rotated to match the coordinate plane of the sensors, and position data received from the sensors is subsequently matched directly with this scaled and rotated image to determine when to fire the print head. Having determined the boundaries of the printing surface in the coordinate plane of the sensors, it would alternatively be possible to map each position coordinate read by the sensors into the original bit-mapped image, without first scaling and rotating the image. From a mathematical sense, both methods are equivalent. The method of the preferred embodiment is believed to be less computationally intensive for most applications.

A particular method for determining the location of a manually moved print head and selectively engaging the print elements to print an image has been described above. In general, this method is a relatively simple algorithm for matching a predetermined desired image with the current position of the print head, and controlling the print elements to generate the image. It is believed that this method will provide a legible and recognizable image of most textual documents, simple drawings, and the like. In the exemplary embodiment, the print device is integrated into a PDA device, and is used as a convenience printer for obtaining printed copies of documents without the need for returning to a fixed location. Printed output produced by such a device does not necessarily have a print quality as good as conventional laser or ink-jet printers having carriage, paper feed mechanisms or other alignment mechanisms.

It will be recognized that certain inaccuracies in the printed image will be introduced as a result of approximations made in the algorithm and other factors. Various alternatives exist to improve the quality of the printed image, but these may entail more cumbersome algorithms, additional hardware, etc. A brief description of some of these alternatives follows, it being understood that the discussion of alternative methods herein is not necessarily exhaustive, and that additional alternatives may be used consistent with the present invention.

First, it will be noted that device 100 (and hence the print head 101) is generally moving at some non-zero velocity during print operation. There is a small time delay between the time that an image of the printing surface is captured by the optical scanning array and the ink from an ink jet print head strikes the printing surface in response, during which time device 100 may move a small distance. If the user always moved the print head in the same direction, this would not be a problem, but the print head will typically be moved back and forth across the printing surface, causing a small positive misregistration on one pass, and a small negative misregistration on the return pass. The algorithm of the preferred embodiment ignores this fact, effectively assuming a zero velocity print head. However, by tracking a sequence of samples from the sensor, print application 302 could estimate the current print head velocity, and adjust the input coordinates from the optical sensors so that the coordinates are shifted a small amount to be the projected coordinates of the sensors at some future time when the ink from the ink jet will strike the printing surface if the print head is fired by the print application. By thus projecting the position of the print head at a future time, the small misregistrations caused by print head motion in different directions would be reduced.

Secondly, it will be noted that the algorithm of the preferred embodiment simply rounds the location of each respective print element to the nearest pixel, and fires the element if the pixel should be printed (but has not yet been printed). A print element will not necessarily be at the center of the pixel. As a further enhancement, it would be possible to estimate the current velocity of the print head, and further to estimate a variable time delay for each print element, at which the print element will be at a minimal distance from the center of the pixel. The firing of the element is therefore delayed until the estimated minimal distance from the center of the pixel. This alternative is more computationally intensive than the first alternative mentioned above, but it may produce a higher quality output.

Thirdly, as noted, the algorithm of the preferred embodiment rounds the print element position to the nearest pixel, which may cause the print element to print at a point which is almost equidistant from the centers of two or more pixels. As a further alternative, it would be possible to simply suppress printing unless the print element is within some small distance of the center of the pixel. This may mean that some pixels are not printed at all as the print head passes over the surface, requiring the user to move device 100 over the same area of printing surface multiple times until all the pixels are printed. Although this technique would likely be slower, it may produce a higher quality printed image.

Fourthly, it will be observed that the sensors in fact determine their location by accumulating (Δx, Δy) data, a process which can be likened to dead reckoning navigation. As a result, cumulative rounding or other factors may over time affect the registration accuracy. Ideally, in order to reduce the effect of such cumulative errors, the user should move the print device back and forth in a regular motion, incrementally moving down the page with each sweep (i.e., the user should not move the device around the printing surface at random). If desired, further accuracy may be obtained by registering the sensor positions to some known feature of the printing surface. If the printing surface has known, regular features (e.g., has a grid of fine lines), these may be used for increasing the accuracy of the location determination. It may additionally be possible to register the sensor position to parts of the image previously printed by print head 101.

In the preferred embodiment described herein, the printing device's x-y motion is detected using a pair of optical sensors. The two sensors are preferably used in order to provide both a location and a print head orientation. In the case of optical sensors which match successive images of the printing surface to determine a change in position, it may be possible for a single sensor to satisfactorily determine both position and orientation. I.e., the sensor would be initially registered at a known orientation, and the sensor electronics would determine a Δx, Δy and Δθ (being change in angular orientation) for each scan cycle, thus determining both position and orientation. Furthermore, the invention herein is not necessarily limited to the use of optical sensors. Any sensing technology which can be mounted on-board the printer itself, give sufficient resolution of movement, and comply with other reasonable design constraints, could alternatively be used. For example, it is well known that a freely rolling ball coupled to a pair of encoding wheels is used in many desktop mouse input devices for sensing x-y motion, and a pair of such balls could alternatively be used to to determine the x-y position and orientation of the printer. As another alternative, it may be possible to establish one or more stationary objects as reference points, and detect printer motion using ultrasonic or radar technology. Any suitable means for detecting motion, now existing or hereafter developed, could alternatively be used.

In the embodiment of FIG. 1A, the print head is located approximately mid-way between the two sensors. In the embodiment of FIG. 1B, the print head is aligned with the two sensors, but not between them. However, many other variations of location of print head and sensor or sensors are possible. For example, the print head could be located in a corner, or along the top edge, of body 106. The optimal configuration involves many design considerations of accuracy, ease of use, calibration technique, likelihood of smudging, etc. For example, the configuration of FIG. 1B is designed so that the sensors and projections are located below the print head. If the device is consistently moved downward on the page, the body will avoid contact with previously printed matter, thus reducing ink smudging. Using the design of FIG. 1B, it is also possible to print very close to an edge and to easily see what has just been printed, which may improve ease of use. On the other hand, location of the print head between the two sensors, as shown in FIG. 1A, may have a better registration accuracy. I.e., because the true print head location is projected from the output of two sensors, any error in the output of a single sensor increases as the print head is located farther from the sensor.

In the preferred embodiment described above, the printing device is used for printing on paper, and is intended as a conveniently available substitute for standard computer printing devices which print on paper. However, the possible applications are not limited to paper, or to printing conventional documents formatted for standard paper. For example, it would alternatively be possible to use a printing device as described herein for printing on a large surface, such as a wall, billboard or similar. Additionally, such a device might be used for printing on irregular surfaces, such as shipping containers or other packaging, clothing, or even the human body. In these alternative implementations, it will be understood that the print head technology would necessarily be something appropriate to the surface to be printed. It should be further understood that, although in the case of printing on a simple sheet of paper a printing device constructed in accordance with the present invention would typically be hand-held, it need not be, and particularly in the case of printing on large surfaces, the printing device might be designed to be held by two hands, or even by more than one person or with a mechanical aid. It should further be understood that the printing device may comprise two or more physical housings, such as a movable print head housed in a first housing, and a processor, data storage facility, display, and other components, housed in a second housing, the two housings communicating with each other via a data communications cable, infra-red link, or other means. In this case, the second housing may be a stationary device, while the first housing containing the print head is moved across the printing surface.

Since the printing device physically contacts the printing surface, there is some possibility of smudging the ink as the image is printed on the surface. The severity of the problem of smudging depends on many factors, such as print technology, type of ink, type of surface, etc. An arrangement of print head at one end of the body, as shown in FIG. 1B, may be used to reduce smudging. Alternatively, it may be possible to use rolling balls instead of projections 107 to reduce smudging.

In the preferred embodiment, the printing device is calibrated to the individual printing surface prior to each image being printed. This calibration routine fits the image to the available print surface, and facilitates a mapping of the image to the coordinate plane of the sensors. However, many alternative calibration methods are possible, and the routine disclosed herein may be varied. Depending on the sensor technology or other design aspects, it may further be possible to avoid calibration to the individual print surfaces. For example, if the sensor "gain", i.e. the change in coordinate units output per unit of actual distance moved, is reasonably consistent for all types of printing surfaces and conditions, it is merely necessary to know the size of the print surface and the starting state of the printing device. The user might specify a size of print surface when the printing application is invoked, or a default size (e.g., 8½×11) may be assumed, which the user can override. The user may then begin at a consistent, known location and printing device orientation on the printing surface, e.g., at the upper left corner, with the device oriented vertically on the page.

Although a specific embodiment of the invention has been disclosed along with certain alternatives, it will be recognized by those skilled in the art that additional variations in form and detail may be made within the scope of the following claims:

What is claimed is:

1. An automated printing apparatus, comprising:
    a body, said body being manually positionable in two-dimensional motion with respect to a printing surface while maintaining a substantially constant proximity to said printing surface;
    a print head mounted to a fixed location on said body;
    at least one sensor mounted on said body, said at least one sensor producing an output;
    a digital controller coupled to said at least one sensor and to said print head, said controller determining two-dimensional position of said print head with respect to said printing surface from the output of said at least one sensor and selectively causing said print head to print on said printing surface responsive to said two-dimensional position of said print head with respect to said printing surface determined from the output of said at least one sensor.

2. The automated printing apparatus of claim 1, wherein said at least one sensor comprises a pair of sensors separated by a distance d, said pair of sensors being used by said digital controller to determine an x-y location and an angular orientation of said print head with respect to said printing surface.

3. The automated printing apparatus of claim 1, wherein said at least one sensor comprises at least one optical sensor, said at least one optical sensor determining an x-y location and an angular orientation of said print head with respect to said printing surface.

4. The automated printing apparatus of claim 1, wherein said automated printing apparatus is integrated into a hand-held digital data processing device having a processor for executing one or more application programs and a display for displaying information to a user.

5. The automated printing apparatus of claim 1, wherein said manually positionable body communicates with a stationary digital data processing device via a communications interface.

6. The automated printing apparatus of claim 1, wherein said printing surface is paper.

7. The automated printing apparatus of claim 1, further comprising a memory storing a digital representation of an image to be printed, wherein said digital controller matches position data received from said at least one sensor with said digital representation of an image to be printed, and selectively causes said print head to print on said printing surface if a position of a print head element corresponds to a part of said image to be printed.

8. The automated printing apparatus of claim 6, wherein said digital representation of an image to be printed comprises a bit-map of said image to be printed.

9. The automated printing apparatus of claim 1, wherein said digital controller calibrates the output of said at least one sensor to said printing surface responsive to a user identification of a plurality of registration points.

10. A method for printing data on a printing surface, comprising the steps of:

providing a digital representation of an image to be printed;

manually moving a printing device in two dimensions relative to said printing surface while in proximity to said printing surface;

automatically determining a two-dimensional position of said printing device while performing said step of manually moving a printing device relative to said printing surface; and automatically engaging said printing device to print on said printing surface at locations corresponding to said image responsive to said step of automatically determining position of said printing device.

11. The method for printing data of claim 10, wherein said step of providing a digital representation of an image to be printed comprises providing a bit-map of an image to be printed.

12. The method for printing data of claim 10, further comprising the step of:

calibrating said printing device to said printing surface.

13. The method for printing data of claim 12, wherein said calibrating step comprises receiving a user identification of a plurality of registration points, and fitting said image to an area defined by said plurality of registration points.

14. The method for printing data of claim 10, wherein said step of automatically determining position of said printing device comprises receiving position input data from at least one sensor mounted on said printing device.

15. The method for printing data of claim 14, wherein said at least one sensor comprises a pair of sensors separated by a distance d, said pair of sensors being used by said printing device to determine an x-y location and an angular orientation of a print head with respect to said printing surface.

16. The method for printing data of claim 14, wherein said at least one sensor comprises at least one optical sensor, said at least one optical sensor determining an x-y location and an angular orientation of a print head with respect to said printing surface.

17. The method of printing data of claim 10, wherein said printing surface is paper.

18. A computer program product for printing data on a printing surface, said program product comprising comprising a plurality of processor executable instructions recorded on signal-bearing media, wherein said instructions, when executed by at least one programmable processor, cause a printing device to perform the steps of:

receiving a digital representation of an image to be printed;

determining a two-dimensional position of said printing device from sensor data while said device is manually moved in two dimensions relative to said printing surface while in proximity to said printing surface; and engaging said printing device to print on said printing surface at locations corresponding to said image responsive to said step of automatically position of said printing device from sensor data.

19. The computer program product for printing data of claim 18, wherein said step of receiving a digital representation of an image to be printed comprises receiving a bit-map of an image to be printed.

20. The computer program product for printing data of claim 18, wherein said instructions, when executed by said at least one programmable processor, cause said printing device to further perform the step of:

calibrating said printing device to said printing surface.

21. The computer program product for printing data of claim 20, wherein said calibrating step comprises receiving a user identification of a plurality of registration points, and fitting said image to an area defined by said plurality of registration points.

22. The computer program product for printing data of claim 18, wherein said step of automatically determining position of said printing device comprises receiving position input data from at least one sensor mounted on said printing device.

23. The computer program product for printing data of claim 22, wherein said at least one sensor comprises a pair of sensors separated by a distance d, said pair of sensors being used by said printing device to determine an x-y location and an angular orientation of a print head with respect to said printing surface.

24. The computer program product for printing data of claim 22, wherein said at least one sensor comprises at least one optical sensor, said at least one optical sensor determining an x-y location and an angular orientation of a print head with respect to said printing surface.

* * * * *

UNITED STATES PATENT AND TRADEMARK OFFICE
CERTIFICATE OF CORRECTION

PATENT NO. : 6,952,284 B2
APPLICATION NO. : 09/943703
DATED : October 4, 2005
INVENTOR(S) : Gregory Paul Andrews and Christopher Robert Smith It is certified that error appears in the above-identified patent and that said Letters Patent is hereby corrected as shown below:

On the title page item, (56) References Cited, Add
--5,927,872     07-27-1999     Yamada . . . . . . . .400/88--

Signed and Sealed this

Ninth Day of October, 2007

JON W. DUDAS
*Director of the United States Patent and Trademark Office*